United States Patent
Matsumoto et al.

(10) Patent No.: US 6,802,958 B1
(45) Date of Patent: Oct. 12, 2004

(54) PROCESS FOR PRODUCING SPHERICAL OXIDE PARTICLES

(75) Inventors: Nobuhito Matsumoto, Niihama (JP); Eiichi Yano, Niihama (JP); Masafumi Shimowake, Niihama (JP); Tetsuro Kamo, Niihama (JP)

(73) Assignees: Nippon Ketjen Co., Ltd. (JP); Akzo Nobel NV (NL)

( * ) Notice: Subject to any disclaimer, the term of this patent is extended or adjusted under 35 U.S.C. 154(b) by 726 days.

(21) Appl. No.: 09/710,950

(22) Filed: Nov. 13, 2000

Related U.S. Application Data

(63) Continuation of application No. PCT/EP99/03266, filed on May 11, 1999.

(51) Int. Cl.[7] ............... C10G 47/00; B01J 21/08; B01J 21/12; B01J 21/14; B01J 23/00

(52) U.S. Cl. ............... 208/111.3; 208/111.35; 502/242; 502/254; 502/255; 502/256; 502/257; 502/258; 502/259; 502/260; 502/261; 502/262; 502/263; 502/308; 502/309; 502/313; 502/314; 502/315; 502/316; 502/319; 502/320; 502/321; 502/322; 502/323; 502/327; 502/332; 502/333; 502/334; 502/335; 502/336; 502/337; 502/338; 502/339; 502/349; 502/350; 502/351; 502/355; 502/407; 502/415; 502/439

(58) Field of Search ............... 208/111.3, 111.35; 502/242, 254–263, 308, 309, 313–316, 319–323, 325–327, 332–339, 349–351, 355, 407, 415, 439, 305; 423/598, 600, 608, 610; 501/103, 105, 133, 134, 153, 154

(56) References Cited

U.S. PATENT DOCUMENTS

| | | | | |
|---|---|---|---|---|
| 3,644,198 A | * | 2/1972 | Wilhelm | 208/111.1 |
| 3,700,742 A | * | 10/1972 | Hayes | 585/267 |
| 4,009,096 A | * | 2/1977 | Pollitzer et al. | 208/111.1 |
| 4,079,092 A | * | 3/1978 | Hayes et al. | 585/268 |
| 4,110,198 A | * | 8/1978 | Hayes et al. | 208/111.1 |
| 4,325,804 A | * | 4/1982 | Everett et al. | 208/58 |
| 4,399,057 A | * | 8/1983 | Hensley, Jr. et al. | 252/435 |
| 4,541,920 A | * | 9/1985 | Seiver | 208/138 |
| 4,584,093 A | * | 4/1986 | Toulhoat et al. | 208/216 R |
| 4,834,865 A | * | 5/1989 | Kukes et al. | 208/59 |
| 4,894,142 A | * | 1/1990 | Steigleder | 208/111.15 |
| 5,080,778 A | * | 1/1992 | Lambert | 208/111.15 |
| 5,139,648 A | * | 8/1992 | Lambert | 208/111.15 |
| 5,395,407 A | * | 3/1995 | Cottringer et al. | 51/309 |
| 5,565,088 A | * | 10/1996 | Nair et al. | 208/58 |

FOREIGN PATENT DOCUMENTS

| | | | |
|---|---|---|---|
| DE | 39 12 504 | 10/1990 | C01B/33/12 |
| DE | 196 00 615 | 7/1997 | B01J/2/22 |
| EP | 0 025 900 | 4/1981 | C01F/7/02 |
| EP | 0 152 599 | 8/1985 | B01J/2/22 |
| EP | 0 704 239 | 4/1996 | B01J/23/85 |
| GB | 1 535 807 | 12/1978 | B01J/2/20 |
| JP | 49-98378 | 9/1974 | |
| WO | WO95/29970 | 11/1995 | C10G/11/18 |

OTHER PUBLICATIONS

*Abstract*, CN 1129950, dated Nov. 9, 1995.
*Abstract*, DE 3242–293–A, Jul. 7, 1983.
*Abstract*, J5 9002–649–A, Sep. 1, 1984.
*Abstract*, JP 10017321–A, Jan. 20, 1998.
*Abstract*, 1988:444022.
*Abstract*, J8 4021–651–B, May 21, 1984.
*Abstract*, 1980:185168.
*Derwent Abstract*, 1973–64633U.
*Derwent Abstract*, 1984–065881.
*Derwent Abstract*, 1985–071311.
*International Search Report*, dated Jan. 10, 1999.

* cited by examiner

*Primary Examiner*—Cam Nguyen
(74) *Attorney, Agent, or Firm*—Louis A. Morris

(57) ABSTRACT

The invention pertains to a process for preparing spherical oxide particles comprising the steps of shaping a starting material comprising an oxide hydrate into particles of substantially constant length by leading the material to a set of two rolls rotating towards each other followed by leading the material to a roll equipped with grooves to form rod-type shapes, cutting the rod-type shapes into particles of substantially constant length, converting the thus formed particles into spheres, and heating the particles to convert the oxide hydrate into an oxide. The process results in particles in which there is substantially no difference in density between the core portion and the shell portion of the particles, which results in a high abrasion resistance. The particles prepared by the claimed process are particularly suitable for the preparation of hydroprocessing catalysts, more in particular for the preparation of hydroprocessing catalysts suitable for the hydroprocessing of heavy hydrocarbon feeds.

6 Claims, No Drawings

PROCESS FOR PRODUCING SPHERICAL OXIDE PARTICLES

CROSS REFERENCE TO RELATED APPLICATIONS

The present invention claims priority of International Con Application Number: PCT/EP99/03266, filed on 11 May 1999 that claims priority of Japanese Application 10-127008, filed 11 May 1998.

BACKGROUND OF THE INVENTION

1. Field of the Invention

The present invention pertains to a process for producing spherical oxide particles with a low wear rate, which are particularly suitable as catalyst carriers. The present invention also pertains to the production of catalysts from these particles.

2. Prior Art

Spherical oxide particles are used in many applications, including, for example, adsorption, and many catalytic applications. They can be applied in fixed bed, moving bed, or ebullated bed applications. In the present specification, the present invention and its advantages will be described with reference to catalysts suitable for hydroprocessing of hydrocarbon feeds. Nevertheless, as the skilled person will recognize, many of the advantages of the process according to the invention will also be important in other applications.

One of the steps in the preparation of ready-for-use products from heavy hydrocarbon oil fractions is hydroprocessing to effect the complete or partial removal of impurities. Heavy feedstocks, such as feeds based on atmospheric residual oils, vacuum residual oils, tar sand oils, and shale oils generally contain organic sulfur compounds and metallic components. These impurities can be removed by contacting the feedstock with a hydroprocessing catalyst at elevated temperature and pressure in the presence of hydrogen. This will cause the organic sulfur compound to be converted to $H_2S$, while the metals precipitate on the catalyst particles.

The use of non-fixed bed processes, such as moving bed processes and ebullated bed processes, is becoming increasingly important in the hydroprocessing of heavy hydrocarbon feedstocks. Non-fixed bed processes have the advantage that it is not necessary to replace the complete catalyst inventory at the same time. Additionally, the contamination of the catalyst inventory with contaminant metals will be more homogeneous. However, the use of a catalyst in a non-fixed bed application places additional requirements on the properties of the catalyst. In particular, the strength and the abrasion resistance of the catalyst become more critical, because the catalyst particles suffer more wear and tear by colliding with each other and with the walls of the unit. In consequence, the conventional extrusion-shaped catalyst particles are less suitable for use in non-fixed bed processes, because these particles have corners which may easily wear down in these applications. Further, because the catalyst is continuously or intermittently fed to or removed from the reactor, it must have such a form as to allow easy flowing and transfer as a slurry containing the reacting substances.

Therefore, for use in non-fixed bed applications spherical catalyst particles are desirable. Additionally, spherical catalyst particles can also be desirable for use in fixed-bed applications, particularly at the front of a catalyst bed to catch particulate materials, such as solid iron and carbon particles present in the feed. The size of the spherical particles depends on the application, but particles of 0.5 to 7 mm diameter, preferably about 2 mm to 5 mm in diameter are being commonly used at present.

Various processes for preparing spherical oxide particles have been described in the art.

EP 0 025 900 describes a process in which a shapeable dough is extruded and divided into particles, after which the particles are formed into spheres, which are then dried and optionally calcined. The extrusion is preferably through circular holes. The forming into spherical particles can, e.g., be carried out using a rotating plate.

GB 1 535 807 describes a method for preparing spherical alumina particles in which a shapeable dough is extruded, after which the extrudate is segmented and balled, and the balls are dried and calcined.

Japanese Patent Laid-Open No.1973-51882 describes a method of forming particles by vertically and horizontally vibrating shaped particles. Moreover, Japanese Patent Laid-Open No.1974-98378 describes a method of feeding a raw powder or shaped particles into a tilted rotary granulator, for granulation. Japanese Patent Publication Nos. 1984-2649, 1984-21651, and 1985-25182 disclose methods of introducing a raw powder into a horizontal turntable while adding a binder solution for granulation.

However, the particles obtained by the granulation methods in which a powder is used as starting material have a dense, hard, outer shell on the surface, which is formed by collision among the moving particles and collision of the moving particles with the side walls of the granulator, while the particle core is less dense.

If the percentage of heat shrinkage between the core portion and the surface layer of a particle differs, the surface layers may peel, so breaking the particles, during or after calcination of the particles. If strips of extrusion-shaped particles are granulated by a rotary granulator, the above mentioned problem of the outer surfaces of the particles becoming dense is alleviated, but it is not solved entirely.

In Japanese Patent Laid-Open No.1998-17321, a method for obtaining small spheres by rotary granulation was disclosed, and it is mentioned that a high strength can be achieved. However, this method is used to produce a porous material with many small pores of 100 Å ($10^{-10}$ meters) or less in diameter, and while it is effective for producing a gas adsorbent or a hydrotreating catalyst for a low-molecular oil, it is not yet satisfactory for producing a hydroprocessing catalyst for a heavy oil requiring many large pores. Besides, there is also the problem that if it is attempted to granulate a sticky compound, the raw material is liable to form lumps by mutual cohesion. Since an inorganic hydrous cake or paste mainly containing alumina is relatively highly sticky, it is necessary to further improve the conventional rotary granulation methods.

On the other hand, Japanese Patent Publication No. 1989-37332, Japanese Patent Laid-Open No. 1990-51418, and Japanese Patent Publication No.1995-24749 disclose the so-called oil-drop method for preparing spherical oxide particles. In these methods a mineral acid or organic acid is added to an alumina powder to form a partial sol dispersion and this is added to an oil layer in the form of droplets, for gelation. These methods have solved the problem caused by the rotary granulation methods in that the particles produced by way of the oil drop method are internally homogeneous. However, it is very costly to manufacture the equipment for these techniques, and it is difficult to control the pore structure as desired. Moreover, to make the size of the obtained particles uniform, a high level of technical skill is required for maintaining proper droplet-forming conditions, solidification conditions, etc. Besides, even the products obtained by these methods of solidification in oil cannot satisfy all of form, breakage strength, and abrasion resistance.

Thus, there is need for a process for producing spherical oxide particles with a uniform particle size and a homogeneous density, that is, where there is substantially no difference in density between the core portions of the oxide particles and the surface portions. This is to ensure that the spherical particles are high in abrasion resistance. The process should be suitable for producing particles of various sizes, in particular with a diameter between 0.5 and 7 mm, preferably with a diameter between 2 and 7 mm. The process should be easy to regulate, and be capable of producing particles with a large pore size and a narrow average particle size distribution.

SUMMARY OF THE INVENTION

To solve the above need, the inventors, in one embodiment of the invention, developed a process for preparing spherical oxide particles which comprises the steps of shaping a starting material comprising an oxide hydrate into particles of substantially constant length by leading it to a set of two rolls rotating towards each other, followed by leading the material to a roll equipped with grooves to form rod-type shapes, cutting the rod-type shapes into particles of substantially constant length, converting the thus formed particles into spheres, and heating the particles to convert the oxide hydrate into an oxide.

A second embodiment of the invention comprises spherical oxide particles having a wear rate of less than 0.5 wt %, more preferably less than 0.1 wt % and substantially no difference in density between the core portion of the particles and the surface portion of the particles.

In a third embodiment of the invention, the inventors developed A process for preparing a hydroprocessing catalyst in which a Group VI and/or a Group VIII metal component are incorporated into spherical oxide particles prepared by way of a process comprising the steps of shaping a starting material comprising an oxide hydrate into particles of substantially constant length by leading the material to a set of two rolls rotating towards each other followed by leading the material to a roll equipped with grooves to form rod-type shapes, cutting the rod-type shapes into particles of substantially constant length, converting the thus formed particles into spheres, and heating the particles to convert the oxide hydrate into an oxide.

Other embodiments of the invention encompass details about the making of the spheres, the properties of the spherical oxide particles, metal components of the hydroprocessing catalyst and the use of the catalyst in a process for the hydroprocessing of a hydrocarbon feed, etc., all of which are hereinafter disclosed in the following discussion of each of the facets of the present invention.

DETAILED DESCRIPTION OF THE INVENTION

The starting material for the process according to the invention is a material comprising an oxide hydrate. The term oxide hydrate is well known in the art and refers to water-containing oxide precursors. The starting material should be shapeable, and should therefore be in the form of a paste or cake. The suitable consistency of the starting material can easily be determined by the skilled person. In doing this, the skilled person should also take into account the conditions prevailing during the conversion into spheres of the shaped particles. At this step of the process the material should be soft enough to obtain spherical particles. It is therefore preferred for the starting materials to have a water content of 50–90%, preferably 55–80%, more preferably 60–70%. The water content is determined by comparing the weight of a sample at room temperature with the weight of the sample after calcination at 500° C. in air for 1 hour. To control the viscosity and the pore structure of the carrier, an organic binder based on a polyalcohol or cellulose, etc., can be added if needed.

The oxide hydrate present in the starting material may, e.g., be a hydrate of alumina, silica, titania, zirconia, or a mixture thereof. The oxide hydrate preferably comprises an alumina hydrate, particularly boehmite or pseudo-boehmite. Preferably, the oxide hydrate comprises at least 50 wt % of alumina hydrate, more preferably at least 60 wt %.

The starting material preferably comprises at least 40 wt % of oxide hydrate, more preferably at least 50%, most preferably at least 65%, calculated on the solids content of the starting material. Non-hydrate materials which may be present in the starting materials include zeolites, natural fibrous minerals such as sepiolite, attapulgite, and halloysite, and natural or synthetic materials such as hectorites or saponites.

Additionally, where necessary the starting material can contain additional components such as phosphorus, boron, alkali metals, alkaline earth metals, Group VI hydrogenation metals, and Group VIII hydrogenation metals. It is preferred for the oxidic part of the starting material (that is, the part of the starting material which will be present in the final oxide particle) to consist essentially of alumina and silica, the wording "consists essentially of" being intended to mean that minor amounts of other components may be present, as long as they do not influence the catalytic activity of the catalyst. Preferably, the oxidic part of the starting material comprises at least 50% of alumina, more preferably at least 70%, most preferably at least 85%. Most preferably, the oxidic part of the starting material consists essentially of alumina.

In the first step of the process according to the invention the starting material is converted into particles of substantially constant length by leading the material to a set of two rolls rotating towards each other, followed by leading the material to a roll equipped with grooves to form rod-type shapes, and cutting the rod-type shapes into particles of substantially constant length. More in particular, the starting material is pressed down from above into the clearance between two parallel rolls. The rolls rotate towards each other when viewed from above, and the hydrous raw material caught between the rolls moves downward to another roll installed beneath the two parallel rolls so as to be brought into contact with them. Said last roll has grooves of a predetermined size formed in the surface in the circumferential direction.

The cake extruded from the two top rollers is pressed into the grooves of the bottom roll. The bottom roll is in contact with a comb for removal of the cake rows formed in the grooves, and the rod-type shapes removed by the comb are cut up into particles by a rotating cutter. The size of the particles can be decided by properly adjusting the size of the roll grooves, the rotating speed of the grooved roll and the speed of the rotary blade. The rod-type shapes can be cylinders, triangular rod-type shapes or square rod-type shapes, etc., although the cross-sectional form is not especially limited. However, considering the ease of later granulation, cylinders or square or other polygon rod-type shapes are preferable, because more obtuse angles are desirable for easier rounding. The diameter of the rod-type shapes preferably is 1.0 to 1.5 times the diameter of the sphere to be formed. Preferably, the rod-type shapes are cut at such intervals that particles are formed which have a length:diameter ratio of 0.5–2:1, more preferably 0.7–1.4:1.

Depending on the nature and consistency of the oxide hydrate it may be preferred in the process according to the invention to add a lubricating oil to the particles before they are made spherical, this to prevent the formation of aggregates and drying out of the surface layers of the particles during rotary granulation. The amount of oil added depends on the stickiness of the raw material and the viscosity of the oil, but can be 10 wt % or less. An amount in excess of 10 wt % is wasteful. The oil can be added by spraying, showering, dropping, or immersion in an oil bath, etc., but spraying by a nozzle is preferable because the oil can be added uniformly. The oil can be added to the rod-type shapes as they leave the grooved roll, to the particles formed by cutting the rod-type shapes, or to the particles as they enter the apparatus in which they will be made spherical. The oil must be hydrophobic and have a certain viscosity. A liquid with a viscosity of 1 to 20 centistokes, preferably 2 to 10 centistokes at 40° C. is desirable. If the viscosity is too high or too low, the oil deposition on the surfaces of particles during rotary granulation will have less effect.

After the rod-type shapes have been cut into particles of substantially constant length, the thus formed particles are converted into spheres. This can be done using apparatus known in the art. Examples are a tilted rotary granulator as described in Japanese laid-open patent application 1974-98378, a horizontal high-speed rotary granulator as used in Japanese Patent Publications 1984-21649, 1984-21651 and 1985-25182. Suitable apparatus is available in the market, for example under the indication marumerizer. The use of a horizontal high-speed rotary granulator is preferred at present.

If an oil is applied during the conversion of the cut particles into spheres, the oil will still be present on the thus formed spherical particles. It can be removed by evaporation, but will in any case be removed during the subsequent calcination step, in which the oxide hydrate is converted into the corresponding oxide.

Optionally, the spherical particles are dried before calcination to decrease the water content thereof. Suitable drying conditions will be evident to the skilled person and include a temperature of 50–200° C. for a period of 0.5–24 hours, in air or in an inert gas.

The calcination step is intended to convert the plastic, shapeable oxide hydrate into the corresponding oxide. As will be recognized by the skilled person, the calcination temperature will thus depend on the nature of the oxide and on the physical properties desired for the oxide which are influenced by the calcination conditions, such as pore volume and average pore diameter. Generally, calcination temperatures of 400–1200° C. are applied for a period of 0.5–24 hours, in air or in an inert gas.

The oxide particles to be produced in accordance with the present invention are spherical. In the context of the present specification the term "spherical particles" is intended to refer to particles meeting the following requirement: [D]–[d]<0.2*[D], wherein [D] stands for the average longest diameter of 100 randomly selected particles and [d] stands for the average smallest diameter of 100 randomly selected particles. Preferably, the particles meet the requirement that [D]–[d]<0.15*[D]. The more spherical the particles are, the better they will function in moving and ebullated bed applications.

The particle size distribution of the spherical oxide particles prepared by the process according to the invention preferably is such that at least 80%, more preferably at least 90%, most preferably at least 95%, of the particles has a diameter within a range of 20% below the number average particle diameter to 20% above the number average particle diameter, more preferably within a range of 10% below the average particle diameter to 10% above the average particle diameter.

The spherical oxide particles formed in accordance with the invention show no difference in density between the surface portion of the particle and the core portion of the particle. This can be confirmed by way of a transmission electron microscopy picture at a magnification of 10,000:1 of the cross-section over the center of a sample particle. There being no difference in density between the surface portion of the particles and their core portion results in particles with a high abrasion resistance and breakage strength. The abrasion resistance of the particles is reflected in a low wear rate, which is determined as follows: 50 g of a sample are put into a cylindrical can with a diameter of 20 cm and bent by 90 degrees, and the can is rotated for 30 minutes to measure the rate at which dust was produced by abrasion. The wear rate of the particles of the invention is below 0.5 wt %, preferably below 0.1 wt %.

Further, there being no difference in density between the surface portions of the particles and their core portions ensures that the large molecules present in heavy hydrocarbon fractions which may be treated with the catalyst which may be produced from the oxide particles prepared by the process according to the invention can easily enter the catalyst particles. This results in better hydroprocessing characteristics and less coke formation. Additionally, the distribution of contaminant metals through the catalyst particles will be more homogeneous, which may lead to a longer catalyst life. In contrast, in the case of spherical particles obtained by the conventional methods described in Japanese Laid-Open patent applications. 1978-51882 and 1974-98878, a shell-like concentrated layer with a thickness of 6 to 100 microns ($10^{-6}$ meters) is observed on the outside of the particles. It is also observed that the primary particles or secondary particles of the raw material are oriented in parallel with the circumference of the spherical oxide particles. Experiments have shown that these spherical oxide particles have an abrasion resistance and strength which are lower than those of the particles produced by the present invention.

The spherical oxide particles prepared by the process of the present invention may be used in many applications their strength and abrasion resistance make them suitable for use in fixed-bed processes, but especially for use in moving bed or ebullated bed processes. They are particularly suitable as catalyst carriers for hydrotreating catalysts for the hydroprocessing of heavy hydrocarbon feedstocks.

The present invention therefore also pertains to a process for preparing a hydroprocessing catalyst in which the spherical oxide particles prepared by the process according to the invention are composited with a Group VI metal component and/or a Group VIII metal component. The Group VI metal preferably is selected from molybdenum, tungsten, or mixtures thereof, with molybdenum being particularly preferred. The Group VIII metal component is preferably selected from nickel, cobalt, or mixtures thereof.

The catalyst thus obtained is particularly suitable for use in the hydroprocessing of heavy hydrocarbon feeds. In this case, the catalyst preferably comprises a Group VI metal and optionally a Group VIII metal. The Group VI metal preferably is present in an amount of 1–10 wt %, calculated as trioxide, preferably 1–7 wt %. If it is present, the Group VIII metal preferably is present in an amount of 0.1–3 wt %, more in particular 0.1–2.5 wt %, calculated as oxide.

Additional active components such as phosphorus or boron may also be present in the catalyst composition. In particular, if the catalyst does not contain a Group VIII metal component it is preferred for it to comprise a small amount of phosphorus, preferably in an amount of 0.1–5 wt %, more preferably 0.5–3 wt %, calculated as $P_2O_5$.

The Group VI metal components and/or a Group VIII metal components may be incorporated into the oxide particles in a conventional manner, e.g., by impregnation, and/or by incorporation into the oxide hydrate before it is shaped into spherical particles. The metal components can be incorporated into the catalyst composition in the form of suitable precursors. For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. The impregnation solution, if applied, may contain a phosphorus compound, such as phosphoric acid, to enhance the stability of the solution. Other compounds the use of which is known in the art, such organic acids such as citric acid, may also be present. It will be clear to the skilled man that there is a wide range of variations on this method. Thus, it is possible to apply a plurality of impregnating steps, the impregnating solutions to be used containing one or more of the component precursors that are to be deposited, or a portion thereof. Instead of impregnating techniques, dipping methods, spraying methods, etc. can be used. In the case of multiple impregnation, dipping, etc., drying and/or calcining may be carried out in between.

After the active metals have been incorporated into the spherical oxide particles, the material is optionally dried at 50–200° C., and subsequently calcined at 350–750° C., preferably 400–700° C. The drying is done to physically remove the deposited water. It can be done under the same conditions as indicated earlier. The calcining is done to bring at least part, preferably all, of the metal component precursors to the oxide form.

The physical properties of the spherical oxide particles produced by the process according to the invention, such as pore volume and pore size, can be controlled as desired, by selecting appropriate preparation conditions, in particular drying and calcination conditions. The pore volume of the spherical particles of the present invention, and of the catalyst resulting therefrom, as measured by the method of mercury penetration generally is in a range of 0.5 to 1.8 ml/g, preferably 0.6 to 1.0 ml/g, depending on the intended use of the catalyst. If the pore volume of the particles is too high, their strength and volume activity will be affected. Further, the particles' bulk density decreases to a level that causes the loading density of the reactor to become insufficient. If the pore volume is too low, the accessibility of the particles will be affected. If the particles are used for producing a hydroprocessing catalyst for heavy hydrocarbon feeds, a too low pore volume will result in the catalyst pores soon being filled with the contaminant metals which precipitate on the catalyst as a result of the hydrodemetallization reaction. This results in a decreased catalyst life.

The average pore diameter of the oxide particles can also be set at a desired value, depending on their intended use. If the oxide particles are used in producing a hydroprocessing catalyst suitable for the hydroprocessing of heavy hydrocarbon feeds, the average pore diameter will generally be 15–30 nm, preferably 17–25 nm, more preferably 18–22 nm. In the context of the present specification the average pore diameter is defined as the pore diameter at which half of the pore volume of the particle is present in pores with a diameter below this value and the other half of the pore volume is present in pores with a diameter above this value. The pore size distribution from which this data is derived is determined by way of mercury intrusion at a contact angle of 140°. If the average pore diameter of the catalyst is either above 30 nm or below 15 nm, the catalyst will not give the desired results in the hydrotreating of heavy hydrocarbon feeds. More in particular, if the average pore diameter is too low, the hydrodemetallization activity of the catalyst will be too low. Further, a too low average pore diameter will lead to a decreased diffusion of the heavy feed components and to blocking of the pores, which will lead to a decreased catalyst life. If the average pore diameter is too high, the surface area of the catalyst will become unacceptably low. This will lead to a decreased activity.

The hydroprocessing catalyst which may be prepared from the spherical oxide particles prepared by the process according to the invention generally has a surface area as determined by way of nitrogen adsorption in the range of 100 to 220 $m^2/g$, preferably between 110 and 140 $m^2/g$. A surface area below 100 $m^2/g$ will lead to a low hydrodesulfurization activity. On the other hand, a surface area above 220 $m^2/g$ can generally not be combined with the requirement that the average pore diameter should be above 15 nm.

The heavy hydrocarbon feed hydroprocessing catalyst prepared from the oxide particles of the present invention generally has 2–30% of its pore volume in pores with a diameter above 100 nm, the so-called macropores, preferably 10–30%, more preferably 15–25%. A lower percentage of macropore volume will lead to a catalyst with decreased activity in the hydrotreating of the heavy hydrocarbon feeds of the present invention, because the macropores function as channels for the large molecules, such as asphaltenes, which are present in the heavy hydrocarbon feeds. Further, the catalyst life will decrease. A higher percentage of macropore volume will lead to a catalyst of decreased strength. Further, since a high amount of macropore volume is accompanied by a lower surface area, a higher percentage of macropore volume will result in a decrease in activity.

It is advisable to convert the catalyst, i.e., the metal components present therein, into the sulfidic form prior to its use in the hydroprocessing of hydrocarbon feedstocks. This may be done in an otherwise conventional manner, e.g., by contacting the catalyst in the reactor at increasing temperature with hydrogen and a sulfur-containing feedstock, or with a mixture of hydrogen and hydrogen sulphide.

The hydroprocessing catalyst prepared from the spherical oxide particles prepared by the process of the present invention can be used in the hydroprocessing of hydrocarbon feedstocks. The term hydroprocessing refers to the conversion of a hydrocarbon feedstock in the presence of hydrogen. It includes, but is not limited to, hydrogenation, hydrodesulfurization, hydrodenitrogenation, hydrodemetallization, and hydrocracking. The catalyst can be used in fixed bed, moving bed, or ebullated bed processes. The use in moving bed or ebullated bed applications is especially advantageous, because in these processes the abrasion resistance of the catalyst is especially important.

The feedstocks to be treated with said hydroprocessing catalyst particularly are heavy hydrocarbon feedstocks, more in particular feedstocks containing substantial amounts of metals and sulfur. Examples of suitable feedstocks are metal-containing petroleum crude oil, atmospheric or vacuum distillate, atmospheric or vacuum residue, solvent-deasphalted oil, heavy cycle petroleum stock, visbreaker oil, shale oil, liquid derived from coal, tar sand, etc. Especially preferred hydrocarbon feedstocks include petroleum crudes and atmospheric or vacuum residue. Generally, the boiling range of suitable feedstocks is such that at least 70% by volume will boil above 450° C. The initial boiling point will generally be 300° C., frequently 350° C. The sulfur content of the feed generally is above 0.1 wt % and will frequently be more than 1 wt %. The nitrogen content generally is above 500 ppm and will frequently be in the range of 500 to 4000 ppm. The feedstock contains contaminant metals such as vanadium, nickel, and iron, generally in amounts above 3 ppm, frequently in the range of 30 to 3500 ppm, and more frequently in the range of 100–1000 ppm, calculated as metal. The process can be carried out under conventional hydroprocessing conditions, which include a temperature of 300–450° C., preferably 340–410° C., a hydrogen partial pressure of 20–220 bar, preferably 100–200 bar, and a liquid hourly space velocity of 0.1–10 h−1, preferably 0.2–2.0 h−1.

The catalyst shows excellent performance in the hydroprocessing of these oils, in particular to effect simultaneous hydrodemetallization and hydrodesulfurization.

EXAMPLE 1

Water was added to 2 kg of a pseudo-boehmite alumina hydrate powder and the mixture was kneaded to obtain an alumina hydrate cake with a water content of 63 wt % (Step 1).

The alumina hydrate cake was pressed into the clearance between two parallel rolls continuously rotating in an inward direction at a speed of 10 rpm. The alumina hydrate cake was led to a lower third roll equipped with grooves provided at equal intervals and of a width and depth of 2.5 mm, said roll being rotated at 15 rpm, and pressed into the grooves of the lower roll.

The alumina hydrate was removed from the grooves using a toothed plate and passed down the plate in the form of strips. A lubricating oil was applied to the strips. The strips were cut into cubes with a length of about 2.5 mm (Step 2). The alumina hydrate grains were fed into a turntable granulator operated at 610 rpm. After one minute the spherical material thus formed was taken out of the granulator (Step 3). The spherical particles were then dried at 120° C. and calcined at 800° C. for 2 hours (Step 4).

The thus obtained granular material was indicated as alumina A.

EXAMPLE 2

Example 1 was repeated, expect that the material was removed from the granulator after three minutes. The thus obtained granular material was indicated as alumina B.

Comparative Example 1

The alumina hydrate cake with a water content of 63 wt % obtained in Step 1 of Example 1 was extruded using an extrusion moulding machine with holes of 2 mm in diameter. The extrusion-moulded articles were fed into the turntable granulator used in Example 1. It was found that the grains adhered to each other to form lumps. Grains with a uniform particle size could not be obtained.

Comparative Example 2

The alumina hydrate cake with a water content of 63 wt % obtained in Step 1 of Example 1 was further kneaded at 60° C., to achieve a water content of 59%, and moulded using an extrusion moulding machine as described for Comparative Example 1. The moulded articles were dry, short strips irregular in length. They were fed into the turntable granulator used in Example 1. One minute later, many dumbbell-shaped grains had formed, but no large lumps. The dumbbell-shaped material was dried and calcined as described in Example 1 to obtain pseudo-granular alumina C.

Comparative Example 3

Comparative Example 2 was repeated, except that the extrusion-moulded strips were rotatively granulated for 3 minutes, after which a spherical material was obtained. The thus obtained granular material was indicated as alumina D.

Experimental Results

Table 1 shows the physical properties of the aluminas produced in the examples and the comparative examples.

To observe the difference in density between the surface and core portions of each grain of a catalyst, a section across the center of a sample grain was photographed by a transmission electron microscope with a magnification of 10,000. On the magnified photograph, it was confirmed in the form of alumina clearance whether a 10 to 100-micron layer in the portion containing the outer surface in the sample section was different from the core portion.

To measure the abrasion strength, 50 g of a sample was put into a cylindrical can with a diameter of 20 cm and bent by 90 degrees, and the can was rotated for 30 minutes to measure the rate at which dust was produced by abrasion.

The total pore volume and the average pore diameter were determined by way of mercury intrusion using a contact angle of 140°.

TABLE 1

Physical properties of granular aluminas obtained in the examples and comparative examples.

| | | Total PV (ml/g) | APD (A) | % PV (>1000 A) | Difference in density between core and shell | Wear rate (%) |
|---|---|---|---|---|---|---|
| Ex. 1 | A | 0.91 | 170 | 20 | no | <0.1 |
| Ex. 2 | B | 0.88 | 200 | 18 | no | <0.1 |
| C. Ex. 2 | — | — | — | — | — | — |
| C. Ex. 3 | C | 0.81 | 200 | 18 | yes | 2.5 |
| C. Ex. 4 | D | 0.87 | 165 | 20 | yes | 2.0 |

Aluminas A and B, prepared by the process according to the invention, show a homogeneous density distribution. In other words, when observed through a microscope the surface portion of the grains looks substantially the same as the core portion. These materials both have a wear rate below 0.1 wt %.

In contrast, transmission electron micrographs of comparative aluminas C and D prepared by extrusion and conversion of the thus formed particles into spheres show that the surface portion of each grain denser than the core portion, and that macropores with a diameter of about one micron were present in a direction in line with the circumference of the oxide particles. These comparative aluminas show a high wear rate. It appears that the worn material was produced by peeling the surfaces off grains.

What is claimed is:

1. A process for preparing spherical oxide particles comprising the steps of: shaping a starting material comprising an oxide hydrate into particles of substantially constant length by leading the material to a set of two rolls rotating towards each other followed by leading the material to a roll equipped with grooves to form rod-type shapes; cutting the rod-type shapes into particles of substantially constant length; converting the thus formed particles into spheres; and heating the particles to convert the oxide hydrate into an oxide.

2. The process of claim 1, wherein a lubricating oil is added before and/or after cutting.

3. Spherical oxide particles having a wear rate of less than 0.5 wt %, more preferably less than 0.1 wt %, and substantially no difference in density between the core portion of the particles and the surface portion of the particles.

4. The spherical oxide particles of claim 3, wherein the wear rate is less than 0.1 wt %.

5. A process for preparing a hydroprocessing catalyst comprising incorporating a Group VI and/or a Group VIII metal component into spherical oxide particles, which is prepared by a process comprising the steps of: shaping a starting material comprising an oxide hydrate into particles of substantially constant length by leading the material to a set of two rolls rotating towards each other followed by shapes; cutting the rod-type shapes into particles of substantially constant length; converting the thus formed particles into spheres; and heating the particles to convert the oxide hydrate into an oxide.

6. The process of claim 5, comprising a Group VI metal component and, optionally, a Group VIII metal component.

* * * * *

UNITED STATES PATENT AND TRADEMARK OFFICE
CERTIFICATE OF CORRECTION

PATENT NO. : 6,802,958 B1
DATED : October 12, 2004
INVENTOR(S) : Nobuhito Matsumoto et al.

It is certified that error appears in the above-identified patent and that said Letters Patent is hereby corrected as shown below:

Column 12,
Line 8, change "a" to -- q --, which is between "incorporating" and before "Group VI"
Line 13, add -- leading the material to a roll equipped with grooves to form rod-types -- between "followed by" and "shapes;"

Signed and Sealed this

Fifteenth Day of February, 2005

JON W. DUDAS
*Director of the United States Patent and Trademark Office*